United States Patent
George et al.

(10) Patent No.: US 8,193,268 B2
(45) Date of Patent: Jun. 5, 2012

(54) HOT-VULCANIZABLE POLYORGANOSILOXANE COMPOSITIONS USEFUL PARTICULARLY FOR MANUFACTURING ELECTRICAL CABLES OR WIRES

(75) Inventors: Catherine George, Saint Genis-les-Ollières (FR); Alain Pouchelon, Meyzieu (FR); Rémi Thiria, Lyons (FR)

(73) Assignee: Bluestar Silicones France SAS, Lyon Cedex (FR)

( * ) Notice: Subject to any disclaimer, the term of this patent is extended or adjusted under 35 U.S.C. 154(b) by 437 days.

(21) Appl. No.: 12/296,576

(22) PCT Filed: Apr. 12, 2007

(86) PCT No.: PCT/EP2007/003248
§ 371 (c)(1),
(2), (4) Date: Jul. 30, 2009

(87) PCT Pub. No.: WO2007/115834
PCT Pub. Date: Oct. 18, 2007

(65) Prior Publication Data
US 2009/0301750 A1 Dec. 10, 2009

(51) Int. Cl.
*C08K 3/26* (2006.01)
*C08K 3/34* (2006.01)
*C08K 3/36* (2006.01)

(52) U.S. Cl. ........ 524/425; 524/432; 524/447; 524/449; 524/451; 524/456; 524/492; 524/493

(58) Field of Classification Search .......... 524/425, 524/432, 447, 449, 451, 456, 492, 493
See application file for complete search history.

(56) References Cited

U.S. PATENT DOCUMENTS

| 3,996,188 A | 12/1976 | Laur |
| 4,419,474 A | 12/1983 | Ackermann et al. |
| 4,677,141 A | 6/1987 | Cornelius et al. |
| 5,922,799 A | 7/1999 | Sollradl |
| 2007/0069187 A1* | 3/2007 | Tonge .......................... 252/511 |

FOREIGN PATENT DOCUMENTS

| EP | 0808867 A1 | 11/1997 |
| EP | 0 902 440 | 3/1999 |
| WO | WO 01/34696 | * 5/2001 |
| WO | WO 01/34705 | * 5/2001 |
| WO | WO 2004/064081 | 7/2004 |
| WO | WO 2005/054352 | 6/2005 |

OTHER PUBLICATIONS

"International Search Report," International Patent Application No. PCT/EP07/03248 (Oct. 22, 2007).
"Burgess Pigment in Paint", at http://www.tavcochem.com/paint/burgess.htm (last visited Feb. 17, 2010).
International Search Report No. PCT/EP2007/003248, dated Jul. 31, 2007 (3 pages).

* cited by examiner

*Primary Examiner* — Peter Szekely
(74) *Attorney, Agent, or Firm* — Baker Donelson Bearman Caldwell & Berkowitz, P.C.

(57) ABSTRACT

A polyorganosiloxane composition that can be vulcanized at high temperature to a silicone elastomer, useful in the field of the manufacture of electrical wires or cables having an improved fire performance is provided. The composition includes a semi-reinforcing filler chosen from the group composed of:—calcined kaolin powders, preferably that have undergone a chemical surface treatment;—talc;—calcium carbonate that may or may not have been surface-treated, for example with vinylsilanes, aminosilanes or (reactive or unreactive) silicone oils; and mixtures thereof.

19 Claims, No Drawings

HOT-VULCANIZABLE POLYORGANOSILOXANE COMPOSITIONS USEFUL PARTICULARLY FOR MANUFACTURING ELECTRICAL CABLES OR WIRES

CROSS REFERENCE TO RELATED APPLICATIONS

This application is a §371 National Stage Application of PCT/EP2007/003248 filed Apr. 12, 2007 which claims priority to French Application 06/03231 filed Apr. 12, 2006.

BACKGROUND OF THE INVENTION

1. Field of the Invention

The present invention relates to polyorganosiloxane compositions which can be vulcanized at high temperature to silicone elastomers, i.e., can be vulcanized at material temperatures generally of between 100° and 200° C. and possibly, where necessary, ranging up to 250° C. The invention also relates to the use of these compositions for producing, in particular by extrusion, sheaths or primary insulations forming part of fire-resistant electrical wires or cables. The invention relates, finally, to the fire-resistant electrical wires or cables which are manufactured using such compositions.

2. Description of Related Art

The expression "fire-resistant electrical wires or cables" is intended to define electrical wires or cables which are required to guarantee high-quality fire performance in terms, at least, of ash cohesion and smoke density. The characteristics which must be exhibited by fire-resistant electrical wires or cables form the subject of legal regulations in many countries, and exacting standardizations have been established.

An electrical cable is composed, in accordance with the known prior art, of one or more single conductors (generally based on Cu or Al); each of these single conductors is protected by a sheath or primary insulation made of one or more concentric layers based on silicone elastomer. Around this sheath or these sheaths (in the case of a multiconductor cable) there is (are) provided one or more packing elements and/or one or more reinforcement elements based in particular on glass fibers and/or mineral fibers. Then comes the external jacketing, which may comprise one or more jackets. In the case of a multiconductor electrical cable, the packing element(s) and/or the reinforcement element(s), which is (are) arranged around the single conductors (each equipped with its primary insulation), constitute(s) a sheath which is common to all of the single conductors. Although the silicone elastomer forming part of the cables is essentially the constituent material of the primary insulation(s), it may also be present, in variable proportions, in the packing element(s) and/or in the reinforcement element(s) (constituting the common sheath in the case of a multiconductor cable) and/or in the external jacket(s).

The number of concentric layers based on silicone elastomer that constitute the sheath or primary insulation of each single conductor, and the wall thickness of each layer, will depend essentially on the requirements imposed in order to maintain operation in accordance with the provisions of the standards. Generally speaking, it is desirable to obtain such operation by using one or two layers each having, appropriately, a thickness equal to at least 0.5 mm and, preferably, to at least 0.8 mm.

In France, for example, one important standard which relates to fire resistance tests on electrical cables, and which must be met, is the standard NF C 32-070 CR1, which relates to the period of operation of cables burning under defined conditions. The fire resistance can be ascribed to the production of ash, which is required to exhibit a certain cohesion, allowing sufficient insulation to be retained for the operation of the cables. In this test, each cable sample is positioned in a metal tube, which is itself then placed in a furnace whose temperature reaches 920° C. within 50 minutes, and this temperature is subsequently maintained for 15 minutes; in the course of this test, the cable sample is subjected to regular impacts (via an impact bar which knocks against the metal tube at a rate of two strikes per minute); the test is passed if control lamps, connected to the cable, which is supplied at a nominal voltage, have not gone out at the end of the test period (that is, after 65 minutes). The standard is met if at least 80% by number of the tests carried out are passed.

Another important standard which relates to fire resistance tests, and which must also be met, is the international standard IEC 61 034, parts 1 and 2 (IEC is the abbreviation of the expression: International Electrotechnical Commission), which relates to the measurement of the density of smoke given off by electrical cables burning under defined conditions. In this test, the light transmittance is measured within a small chamber of 27 $m^3$ obscured by the smoke produced by burning lengths of cable under the action of an alcohol flame installed under defined conditions. The standard is met if at least 60% light transmittance is obtained.

The aforementioned standards can only be met for electrical wires or cables of which at least the primary insulation materials have been the subject of particular study with regard to their inhibition of fire spread. In practice, in accordance with the known prior art, it has been observed that primary insulating materials based on silicone elastomers obtained by high-temperature vulcanization of appropriate poly-organosiloxane compositions are able to satisfy the flame spread inhibition tests. When the silicone elastomer burns, it is transformed into an ashy insulating substance which has a certain cohesion, and it emits white smoke, which originates from the self-ignition of volatile residues that are produced by the breakdown of the elastomer.

In the prior art, polyorganosiloxane compositions which can be vulcanized at high temperature to silicone elastomers have been described that comprise a polyorganosiloxane polymer which crosslinks by peroxide catalysis, fillers of fluxing type and/or of lamellar type, which may be alone or in combination with platinum and with metal oxides, so as to give rise, in the event of a fire, to the formation of an insulating ashy substance which has a certain cohesion, allowing the operating time of burning cables to be prolonged. Mention may be made of EP-A-0 467 800, which proposes the use both of ZnO (as fluxing agent) and of mica (as lamellar filler), optionally in combination with a compound of platinum and/or metal oxides such as, for example, titanium oxide and the oxide $Fe_3O_4$.

As an illustration of the prior art, in Patent Application WO 01/34696 polyorganosiloxane compositions that can be vulcanized at high temperature to silicone elastomers are set out that contain:

100 parts of an ingredient a) consisting of at least one polyorganosiloxane polymer;
5 to 80 parts of at least one reinforcing filler;
0.2 to 8 parts of an organic peroxide;
8 to 30 parts of mica;
6 to 20 parts of zinc oxide;
0 to 15 parts of at least one additive customarily used in the field of high-temperature-vulcanizing polyorganosiloxane compositions, said compositions being characterized in that they contain, in addition, as other necessary ingredients:
- 0.0010 to 0.02 parts of platinum, a platinum compound and/or a platinum complex;
- 2 to 10 parts of titanium oxide; and
- 50 to 120 parts of an ingredient i) consisting of at least one bulking filler.

Other compositions are set out in Patent Application WO 01/34705 which describes polyorganosiloxane compositions that can be vulcanized at high temperature to silicone elastomers having an improved fire performance, containing:
- a) at least one polyorganosiloxane polymer;
- b) at least one reinforcing filler;
- c) an organic peroxide;
- d) mica;
- e) zinc oxide;
- f) optionally at least one additive customarily used in the field of hot-temperature-vulcanizing polyorganosiloxane compositions, said compositions being characterized in that they contain, in addition, as other necessary ingredients:
- g) platinum, a platinum compound and/or a platinum complex;
- h) titanium oxide;
- i) at least one bulking filler; and
- j) at least one mineral species belonging to the wollastonite group.

Finally, Patent Application WO 2004/064081 describes the use of polyorganosiloxane compositions that can be vulcanized at high temperature to silicone elastomers containing:
- a) at least one polyorganosiloxane polymer;
- b) at least one reinforcing filler;
- c) an organic peroxide;
- d) mica;
- e) zinc oxide;
- f) optionally at least one additive customarily used in the field of high-temperature-vulcanizing polyorganosiloxane compositions;
- g) platinum, a platinum compound and/or a platinum complex;
- h) titanium oxide;
- i) at least one bulking filler; and
- j) optionally at least one mineral species belonging to the wollastonite group, said compositions being characterized in that the bulking fillers i) consist of surface-treated aluminum hydroxide $Al(OH)_3$ powders.

However, such polyorganosiloxane compositions that can be vulcanized at high temperature to silicone elastomers proposed to date are not completely satisfactory especially from the point of view of the preparation and use of such compositions. Specifically, these compositions have the disadvantage of exhibiting tackiness properties that thus complicate their handling (or "their processability") during an industrial preparation or when they are used in extrusion within the context of the manufacture of electrical wires or cables. Furthermore, a compromise is still sought in terms of ceramization, low density of the smoke released by burning electrical cables, mechanical properties before and after aging and ease of use (or "processability") of the product.

SUMMARY OF THE INVENTION

An aim of the present invention is therefore to develop polyorganosiloxane compositions that be vulcanized at high temperature to silicone elastomers which are capable, even when they are used just to produce the primary insulation, of endowing the electrical wires and cables with a very high quality fire performance, at least, by the realization of the following points:
- good ash cohesion allowing, on the one hand, for all the compositions according to the invention, the standard NF C 32-070 CR1 to be met at 500 volts; and
- good ability to maintain a low smoke density that makes it possible to attain, generally, the objective of more than 80% transmittance according to the standard IEC 61 034, parts 1 and 2, this with an easier implementation of the polyorganosiloxane composition which no longer has the detrimental tackiness properties of the prior art, thus allowing easier handling, which is an important advantage for industrial manufacture.

Another aim of the present invention is also the development of high-temperature-vulcanizing poly-organosiloxane compositions that, while possessing improved combustion stability, simultaneously possess good mechanical properties in both the uncured and cured states, and in particular after aging for 10 days at 200° C. in accordance with the IEC 2 cable standard (especially in terms of: Shore A hardness, tensile strength, elongation at break and elastic modulus).

Polyorganosiloxane compositions that can be vulcanized at high temperature to silicone elastomers have now been found, and it is this which constitutes the first subject of the present invention, that can be used especially in the field of manufacture of electrical wires or cables having an improved fire performance compared to what takes place when using the teaching of the prior art, with, as an objective that of carrying out at least the realization of the improvements explained above relating to the ash cohesion and smoke density, while having good mechanical properties for the silicone elastomers formed.

More precisely, the present invention, taken in terms of its first subject, relates to a polyorganosiloxane composition that can be vulcanized at high temperature to a silicone elastomer, usable especially in the field of the manufacture of electrical wires or cables having an improved fire performance, comprising:
- a) at least one polyorganosiloxane polymer;
- b) at least one reinforcing filler;
- c) at least one organic peroxide;
- d) mica;
- e) zinc oxide;
- f) optionally at least one additive customarily used in the field of high-temperature-vulcanizing polyorgano-siloxane compositions;
- g) platinum, a platinum compound and/or a platinum complex;
- h) titanium oxide;
- i) at least one bulking filler;
- j) optionally at least one mineral species belonging to the wollastonite group; and
- k) at least one semi-reinforcing filler k), said composition being characterized in that the semi-reinforcing filler k) is chosen from the group composed of:
- calcined kaolin powders, preferably that have undergone a chemical surface treatment;
- talc;
- calcium carbonate that may or may not have been surface-treated, for example with vinylsilanes, aminosilanes or (reactive or unreactive) silicone oils; and
- mixtures thereof.

Thus, the Applicant discovered that the use of a specific semi-reinforcing filler k) in the composition according to the invention results in a good compromise in the electrical wires or cables application and makes it possible to obtain, good mechanical properties of the elastomer before and after aging (10 days at 200° C.);
good ash cohesion;
good ability to maintain low smoke density;
good extrudability; and
an improved ease of use (or "processability") of the composition relative to the compositions of the prior art.

DETAILED DESCRIPTION OF A PREFERRED EMBODIMENT

Kaolins are alumino-silicates that predominantly comprise the following species: $Al_2O_3.2SiO_2.2H_2O$. The physical properties of kaolin are modified by a high temperature (700 to 1200° C.) treatment (calcination). Calcination increases the whiteness of the particles, making them less hydrophilic and reducing their electrical conductivity. The nature of the chemical surface treatment of the calcined kaolins is not restricted to a preference for treatments based on (reactive or unreactive) silicone oils or on vinylsilanes or aminosilanes.

Without being restrictive, their density is around 2.6, their specific surface area is between 8 and 20 $m^2/g$ and the particle size is between 0.5 and 1.5 μm.

Thus the compositions according to the present invention comprise at least one polyorganosiloxane polymer a) containing from 0 to 4%, preferably from 0.01 to 3%, by weight, of a vinyl group. When these polyorganosiloxane polymers a) have viscosities at 25° C. of between 50 000 and 1 000 000 mPa·s, they are called oils, but their viscosity may be greater than 1 000 000 mPa·s, and they are then called gums. In the compositions according to the present invention, the polyorganosiloxane polymers may be oils or gums or mixtures. These polyorganosiloxane polymers are linear polymers whose diorganopolysiloxane chain is composed essentially of units of formula $R_2SiO$. This chain is terminated at each end by a unit of formula $R_3Si_{0.5}$ and/or a radical of formula OR'. In these formulae:

the symbols R, which are identical or different, represent monovalent hydrocarbon radicals such as: alkyl radicals, for example, methyl, ethyl, propyl, octyl, octadecyl; aryl radicals, for example, phenyl, tolyl, xylyl; aralkyl radicals such as, for example, benzyl, phenethyl; cycloalkyl and cycloalkenyl radicals such as, for example, cyclohexyl, cycloheptyl, and cyclohexenyl radicals; alkenyl radicals, for example, vinyl and allyl radicals; alkaryl radicals, cyanoalkyl radicals such as, for example, a cyanoethyl radical; haloalkyl, haloalkenyl and haloaryl radicals, such as, for example, chloromethyl, 3,3,3-trifluoropropyl, chlorophenyl, dibromophenyl, and trifluoro-methylphenyl radicals;

the symbol R' represents a hydrogen atom, an alkyl radical having 1 to 4 carbon atoms, or the beta-methoxyethyl radical.

Preferably at least 60% of the groups R represent methyl radicals. The presence, along the diorganopolysiloxane chain, of small amounts of units other than $R_2SiO$, for example of units of formula $RSiO_{1.5}$ and/or $SiO_2$, is not, however, excluded in a proportion of not more than 2% (these % values express the number of T and/or Q units per 100 silicon atoms).

As specific examples of units of formulae $R_2SiO$ and $R_3SiO_{0.5}$ and of radicals of formula OR', mention may be made of those of formulae:

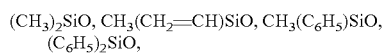

$CH_3(C_2H_5)SiO$, $(CH_3CH_2CH_2)CH_3SiO$, $CH_3(n\text{-}C_3H_7)SiO$, $(CH_3)_3SiO_{0.5}$, $(CH_3)_2(CH_2\!=\!CH)SiO_{0.5}$, $CH_3(C_6H_5)_2SiO_{0.5}$, $CH_3(C_6H_5)(CH_2\!=\!CH)SiO_{0.5}$, OH, $-OCH_3$, $-OC_2H_5$, $-O\text{-}n\text{-}C_3H_7$, $-O\text{-iso-}C_3H_7$, $-O\text{-}n\text{-}C_4H_9$, $-OCH_2CH_2OCH_3$.

These oils and gums are sold by silicone manufacturers or may be manufactured by carrying out techniques already known.

The reinforcing filler b) consists of pyrogenic silica, precipitated silica or a mixture of these two species. As silicas that can be used, mention may be made of fillers characterized by a fine particle size, often of less than or equal to 0.1 μm, and a high ratio of specific surface area to weight, generally in the range from about 50 square meters per gram to more than 300 square meters per gram. Silicas of this type are commercially available products and are well known in the technique of silicone rubber manufacture. These silicas may be prepared by a pyrogenic route (and called pyrogenic silica or fumed silica) or by wet processes (precipitated silicas) and may or may not be treated with organosilicon compounds, normally used for this purpose. The chemical nature and the preparation process are not important for the purposes of the present invention, provided that the silica is capable of exerting a reinforcing action in the finished elastomer. Of course, cuts of various silicas may also be used.

The organic peroxide constituting ingredient c) may be any one of those acting as vulcanizing agents for compositions forming silicone elastomers. It may thus be any of the peroxides or peresters that it is known to employ with silicone elastomers, for example di-tert-butyl peroxide, benzoyl peroxide, monochloro-benzoyl peroxide, 2,4-dichlorobenzoyl peroxide, tert-butyl peracetate, dicumyl peroxide, 2,5-dimethylhexane-2,5-diperbenzoate and 2,5-bis(tert-butylperoxy)-2,5-dimethylhexane. During the manufacture of electrical cables or wires by extrusion, the choice of peroxide will depend in practice on the process employed to cure the elastomer (vulcanization process). When the vulcanization process operates in the absence of pressure (for example, hot-air oven and/or (infrared) radiation, the peroxide used is preferably monochlorobenzoyl peroxide and/or 2,4-dichlorobenzoyl peroxide. When the vulcanization process operates in the presence of pressure (for example, vapor tube), the peroxide used is preferably 2,5-bis(tert-butylperoxy-2,5-dimethylhexane.

The mica which constitutes ingredient d) of the compositions of the present invention may be of the muscovite type or of the phlogopite type and the size of the mica particles is not especially critical provided that it is small enough to allow uniform dispersion in the ingredients of the composition. The mica is preferably provided in the form of powdered mica or of mica flour having particles smaller than 100 μm in size.

The zinc oxide which constitutes ingredient e) of the compositions according to the present invention is a white or slightly yellowish powder.

The platinum, ingredient g), may be in the form of (elemental) platinum metal or, in particular, in the form of a chloroplatinic acid (for example hexachloroplatinic acid $H_2PtCl_6$); or in the form of complexes of platinum and of organic products, such as especially complexes of platinum and of vinyl organosiloxanes (for example, the Karstedt complex), complexes such as those of formula $(PtCl_2.\text{olefin})_2$ and $H(PtCl_3.\text{olefin})$ in which the olefin represents ethylene, propylene, butylene, cyclohexene or styrene, and complexes of platinum chloride and cyclopropane.

The titanium oxide h) is a white powder.

The bulking filler i) is more generally a crystalline silica, an alumina or a mixture of these two species. As alumina, it is advantageous to employ a highly dispersible alumina which may or may not be doped in a known manner. Of course, it is also possible to use cuts of various aluminas. As nonlimiting examples of such aluminas, mention may be made of the aluminas A 125, CR 125, and D 65CR from Baïkowski or the aluminas (for example AP 40 VS1) from Nabaltec.

A crystalline silica often has a particle size greater than 0.1 μm. The term "crystalline silica" is understood to mean ground quartz and diatomaceous earth. Of course, it is also possible to use cuts of various crystalline silicas. The bulking filler i) is preferably ground quartz.

The compositions according to the present invention also contain, as optional ingredient, at least one mineral species j) belonging to the wollastonite group. The wollastonite group comprises the following mineral species: calcium metasilicate ($CaSiO_3$) or wollastonite; mixed calcium sodium metasilicate ($NaCa_2HSi_3O_9$) or pectolite; and mixed calcium manganese metasilicate $[CaMn(SiO_3)_2]$ or bustamite. Of course, it is possible to use a mixture of these various species. Preferably, ingredient j), when one is used, is a wollastonite. Wollastonite exists in two forms: wollastonite itself, which chemists denote by $\alpha$-$CaSiO_3$, which is commonly found in the natural state, and pseudo-wollastonite or $\beta$-$CaSiO_3$. More preferably, the wollastonite $\alpha$-$CaSiO_3$ is used. The mineral species j) belonging to the wollastonite group may be non-surface-treated or may be treated with an organosilicon compound of the type of those mentioned above in respect of the aluminum hydroxide powder.

In addition to the ingredients a), b), c), d), e), g), h), i) and j) as specified above, the compositions according to the present invention may furthermore optionally contain one or more auxiliary additives f) such as, especially: at least one "antistructuring" product f1); and/or at least one polysiloxane resin f2); and/or at least one stabilizing agent f3); and/or at least one pigment f4) in order to manufacture colored wires and cables; and/or at least one boron-based compound f5).

According to a preferred embodiment of the invention, the compositions are compositions which can be vulcanized at high temperature to silicone elastomers and which contain, based on 100 parts by weight of polyorganosiloxane polymer(s) a):

15 to 100 parts of reinforcing filler(s) b);
0.2 to 8 parts of organic peroxide c);
0.5 to 30 parts of mica d);
0.2 to 10 parts of zinc oxide e);
0 to 15 parts of auxiliary additive(s) f);
0.0005 to 0.02 parts of ingredient g) expressed by weight of (elemental) platinum metal (i.e., 5 ppm to 200 ppm),
0.5 to 10 parts of titanium oxide h);
20 to 100 parts of bulking filler(s) i);
0 to 10 parts of one or more species j) belonging to the wollastonite group; and
1 to 100 parts of semi-reinforcing filler(s) k), preferably 20 to 80 parts and more preferably still 40 to 70 parts.

Returning to the auxiliary additive(s) f), when one or more of these are used, it (they) is (are) represented more specifically by [per 100 parts by weight of polyorganosiloxane polymer(s) a)]:

0.1 to 15 parts by weight of an "antistructuring" product f1) based on polydimethylsiloxane oil(s) having a viscosity of between 10 and 3000 mPa·s at 25° C. and terminated at each chain end by hydroxyl groups and/or poly(methylvinyl)siloxane oil(s) having a viscosity of between 10 and 1000 mPa·s at 25° C. and terminated at each chain end by hydroxyl groups; and/or 0.1 to 5 parts of polysiloxane resin(s) f2) represented by: resins called MQ essentially comprising $R'''_3SiO_{0.5}$ and $SiO_{4/2}$ units in which $R'''$ represents optionally halogenated monovalent hydrocarbon groups having less than 7 carbon atoms, the weight ratio of $R'''_3SiO_{0.5}$ to $SiO_{4/2}$ being between 0.5/1 and 1/2/1; M'Q resins essentially comprising $HR'''_2SiO_{0.5}$ and $SiO_2$ units in which $R'''$ has the meaning shown above, the weight ratio of $HR'''_2SiO_{0.5}$ to $SiO_2$ being between 0.5/1 and 10/1; and/or 0.01 to 4 parts of stabilizing agent(s) f3) such as, especially: a metal salt of an organic acid, such as an iron or cerium salt, for example iron or cerium octoate (proportions ranging more specifically from 0.01 to 1 part); a cerium oxide, a cerium hydroxide or an iron oxide (proportions ranging more specifically from 0.1 to 4 parts); the oxide CaO, the oxide MgO (proportions ranging more specifically from 0.01 to 0.4 parts); and/or 0.01 to 5 parts of colored pigment(s) f4); and/or 0.01 to 3 parts of boron-based compound(s) f5), such as boric acid and its derivatives, for example of the alkyl ester type having from 1 to 3 carbon atoms;

the total amount of additive(s), when one or more of them are used, having to be equal: to 15 parts by weight in the case of compositions taken in general; to 12 parts in the case of "preferred" compositions; and to 10 parts in the case of "more preferred" compositions.

According to one preferred embodiment of the invention, cerium hydroxide is present in an amount of 0.1 to 10 parts in order to improve the ash cohesion.

To prepare the compositions according to the invention, the various ingredients are intimately mixed by means of devices well known in the silicone elastomer industry, it being possible to incorporate these in any order.

Furthermore, the invention, according to a second subject, relates to the use of polyorganosiloxane compositions that have just been described for the production, in particular, of sheaths or primary insulations of single conductors used in the construction of fire-resistant electrical wires or cables.

According to a third subject, the invention relates to electrical wires or cables which are manufactured using the polyorganosiloxane compositions according to the first subject of the invention.

Within the context of such use, a composition according to the invention may be deposited around each single conductor using standard processes, especially extrusion processes. The material thus deposited is then crosslinked by heating in order to form the primary insulation made of silicone elastomer. The heating time obviously varies with the temperature of the material and any working pressure. The temperature of the material is generally in the range from 100° C. to 200° C. It is possible to deposit two or more layers at the same time using a tandem extrusion line fitted, for example, with a crosshead, or using a coextrusion line.

The invention also relates to the use of polyorganosiloxane compositions according to the first subject of the invention for the production of the sheath or primary insulation of one or more single conductors used in the construction of fire-resistant electrical wires or cables, which consists in depositing said composition around each single conductor and then in crosslinking it to a silicone elastomer by heating to a material temperature ranging from 100° C. to 200° C. The invention also relates to the fire-resistant electrical wires or cables manufactured by the use of polyorganosiloxane compositions as described above.

The electrical wires or cables according to the invention offer a low smoke density which makes it possible to obtain more than 80% light transmittance in accordance with the standard IEC 61 034, part 1 and that meet the standard NFC 32-070 CR1 at 500 volts.

Other features or advantages of the invention will appear more clearly in view of the examples given below solely by way of indication.

EXAMPLE and COMPARATIVE EXAMPLE A

1. Composition According to the Invention (all the Parts are Given by Weight)

1.1-Preparation:

The following were mixed in a Z-blade mixer mill for 2 hours at room temperature (23° C.):
- 65 parts of a polyorganosiloxane a) which is a polydimethylsiloxane terminated at each of its two ends by a dimethylvinylsiloxy unit, containing 120 ppm of vinyl (Vi) groups and having a viscosity of 20 million mPa·s at 25° C.;
- 35 parts of a polyorganosiloxane a) which is a poly(dimethyl)(methylvinyl)siloxane terminated at each of its two ends by a trimethylsiloxy unit, containing within the chain 720 ppm of Vi groups and having a viscosity of 20 million mPa·s at 25° C.;
- 20 parts of $D_4$ (octamethylcyclotetrasiloxane)-treated pyrogenic silica b) having a specific surface area of 200 $m^2/g$;
- 13 parts of pyrogenic silica b) having a specific surface area of 150 $m^2/g$;
- 3 parts of a polydimethylsiloxane oil f1) terminated at both its ends by dimethylhydroxysiloxy units, containing 9% by weight of hydroxyl OH, having a viscosity of 50 mPa·s at 25° C.;
- 2 parts of a poly(methylvinyl)siloxane oil f1) terminated at both its ends by methylvinyl-hydroxysiloxy units, containing 9% by weight of OH and, within the chain, 3% by weight of Vi groups, having a viscosity of 25 mPa·s at 25° C.;
- 1.8 parts of muscovite-type mica d);
- 5 parts of zinc oxide e);
- 2.8 parts of pyrogenic $TiO_2$ h);
- 3.5 parts of α-$CaSiO_3$ wollastonite j) treated with a methylalkoxysilane, sold by the company Quartz Werke under the name Wollastonite Tremin 283-800 TST;
- 0.0025 parts of platinum metal g), provided in the form of a solution in divinyltetramethyldisiloxane of a platinum complex containing 10% by weight of platinum ligated by divinyltetramethyldisiloxane (Karstedt complex);
- 0.29 parts of calcium oxide f3);
- 0.4 parts of iron octoate f3);
- 2 parts of $Ce(OH)_4$ f3);
- 48.5 parts of filler i), which is ground quartz, sold by the company Sifraco (Paris, France) under the name E600; and
- 41.6 parts of filler k) which is calcined kaolin-surface-treated with aminosilane, sold by the company Burgess (USA) under the name B2211.

The mixture obtained above is then worked on a 2-roll mill and the organic peroxide making up catalyst c) is added to the worked mixture.

1.2-Characterization of the Composition:

A fraction of the homogeneous mass obtained in the mixer is catalyzed with 1.5 parts of 2,4-dichlorobenzoyl peroxide per 100 parts of homogeneous mass. It is then cut into strips which are fed into the extruder used to manufacture an electrical cable. The manufacture of the cable is a standard construct consisting in producing a cable 3 mm in diameter comprising a single copper conductor 1.38 mm in diameter, around which a sheath or primary insulation is installed, made of silicone elastomer and having a thickness of 0.81 mm, which is obtained by subjecting the single conductor, coated with the aforementioned homogeneous polyorganosiloxane composition, to vulcanization carried out in a hot-air oven at a temperature of the order of 250° C. (producing a material temperature of the order of 130° C.-140° C.), for 46 seconds. Standardized specimens are subsequently taken from the cable, and the following properties are measured:
- ash cohesion at 500 volts, in accordance with the standard NF C 32-070 CR1, and
- smoke density in accordance with the standard IEC 61 034, part 1, in % transmittance.

This homogeneous mass is then converted in a suitable mold at 115° C. for 8 minutes in order for plaques 2 mm in thickness to be obtained. In this way, plaques in a non-post-cured (NPC) condition are obtained. A fraction of the plaques is then subjected to an aging or post-curing (PC) treatment of 10 days at 200° C. Subsequently, standardized specimens of all of these plaques are taken, and the following properties are measured:
- Shore A hardness ($H_{SA}$) in accordance with the standard DIN 53505,
- tensile strength (TS) in MPa, in accordance with the standard AFNOR NF T 46002,
- elongation at break (E/B) in %, in accordance with the preceding standard, and
- elastic modulus (EM) at 100%, in MPa, in accordance with the preceding standard.

The results obtained are reported in the table I which appears below.

2. Composition of the Comparative Example 2.1-Preparation

The following were mixed in a Z-blade mixer mill for 2 hours at room temperature (23° C.):
- 66.61 parts of a polyorganosiloxane a) which is a polydimethylsiloxane terminated at each of its two ends by a dimethylvinylsiloxy unit, containing 120 ppm of Vi groups and having a viscosity of 20 million mPa·s at 25° C.;
- 33.39 parts of a polyorganosiloxane a) which is a poly(dimethyl)(methylvinyl)siloxane terminated at each of its two ends by a trimethylsiloxy unit, containing within the chain 720 ppm of Vi groups and having a viscosity of 20 million mPa·s at 25° C.;
- 19.07 parts of $D_4$ (octamethylcyclotetrasiloxane)-treated pyrogenic silica b) having a specific surface area of 200 $m^2/g$;
- 12.4 parts of pyrogenic silica b) having a specific surface area of 150 $m^2/g$;
- 2.86 parts of a polydimethylsiloxane oil f1) terminated at both its ends by dimethylhydroxysiloxy units, containing 9% by weight of OH, having a viscosity of 50 mPa·s at 25° C.;
- 1.91 parts of a poly(methylvinyl)siloxane oil f1) terminated at both its ends by methylvinyl-hydroxysiloxy units, containing 9% by weight of hydroxyl OH and, within the chain, 3% by weight of vinyl groups, having a viscosity of 25 mPa·s at 25° C.;

9.61 parts of muscovite-type mica d);
4.89 parts of zinc oxide e);
3.46 parts of pyrogenic $TiO_2$ h);
6.62 parts of α-$CaSiO_3$ wollastonite j) treated with a methylalkoxysilane, sold by the company Quartz Werke under the name Wollastonite Tremin 283-800 TST;
0.003 parts of platinum metal g), provided in the form of a solution in divinyltetramethyldisiloxane of a platinum complex containing 10% by weight of platinum ligated by divinyltetramethyldisiloxane (Karstedt complex);
0.28 parts of calcium oxide f3);
0.39 parts of iron octoate f3);
2.76 parts of $Ce(OH)_4$ f3); and
66.17 parts of filler i), which is aluminum trihydroxide treated with 1% by weight of vinyltri(2-methoxyethoxy) silane, sold by the company Nabaltec under the name Aluminium hydroxide AP 40 VS1.

The mixture obtained above is then worked on a 2-roll mill and the organic peroxide c) is added to the worked mixture.

It is on the two rolls of the mill that the ease of use (or "processability") of the blend produced is evaluated. The blend is evaluated according to the following scale:

0=blend very tacky on the roll, not allowing it to be worked on the roll;
1-2=tacky, the blend is difficult to process on the roll;
3-4=slightly tacky;
5=not tacky, the blend is easily processed on the roll.

2.2-Characterization of the Composition
This is carried out as indicated above in §1.2.

TABLE I

|  |  | Example (invention) | Comparative example |
|---|---|---|---|
| NPC mechanical properties |  |  |  |
| $H_{SA}$ |  | 65 | 73 |
| TS (MPa) |  | 7.6 | 7.8 |
| E/B (%) |  | 260 | 190 |
| EM 100 (MPa) |  | 3.6 | 5.1 |
| PC mechanical properties |  |  |  |
| $H_{SA}$ |  | 68 | 74 |
| TS (MPa) |  | 7.5 | 6.6 |
| E/B (%) |  | 185 | 150 |
| EM 100 (MPa) |  | 4.1 | 5 |
| Ash cohesion at 500 volts (time in minutes) | Test No. 1 | >95 | 69 |
|  | Test No. 2 | >95 | 79 |
|  | Test No. 3 | 49 | 73 |
|  | Test No. 4 | >95 | 82 |
|  | Test No. 5 | >95 | >95 |
|  | Test No. 6 | 77 | 57 |
|  | Test No. 7 | >95 | >95 |
|  | Test No. 8 | 66 | >95 |
|  | Test No. 9 | >95 | >95 |
|  | Test No. 10 | 82 | >95 |
|  | Average (minutes) | 84 | 84 |
|  | Balance | 9/10 | 9/10 |
|  | Success rate | 90% | 90% |
| "Processability" 0-5 |  | 5 | 2 |
| Smoke density (% transmittance) |  | 86% | 86% |

It will be noted that the present invention makes it possible to achieve the desired compromise ("processability", ceramization, smoke density, mechanical properties).

Furthermore, the mechanical properties of the elastomer according to the invention before and after aging (10 days at 200° C.) are improved by 20 to 30% relative to the comparative example. It is observed that the composition according to the invention before crosslinking is not tacky, whereas the composition of the comparative example is tacky. Thus the use of the composition according to the invention is easy compared to that of the comparative example.

The invention claimed is:

1. A polyorganosiloxane composition that can be vulcanized at high temperature to a silicone elastomer, useful in the field of the manufacture of electrical wires or cables having an improved fire performance, comprising:
   a) at least one polyorganosiloxane polymer;
   b) at least one reinforcing filler;
   c) at least one organic peroxide;
   d) mica;
   e) zinc oxide;
   f) optionally at least one additive customarily used in the field of high-temperature-vulcanizing polyorganosiloxane compositions;
   g) platinum, a platinum compound and/or a platinum complex;
   h) titanium oxide;
   i) at least one bulking filler;
   j) optionally at least one mineral species belonging to the wollastonite group; and
   k) at least one semi-reinforcing filler k),
   wherein that the semi-reinforcing filler k) is at least one selected from the group consisting of:
      calcined kaolin powders;
      talc; and
      calcium carbonate that may or may not have been surface-treated.

2. The composition as claimed in claim 1, wherein said composition comprises based on 100 parts by weight of polyorganosiloxane polymer(s) a):
   15 to 100 parts of reinforcing filler(s) b);
   0.2 to 8 parts of organic peroxide c);
   0.5 to 30 parts of mica d);
   0.2 to 10 parts of zinc oxide e);
   0 to 15 parts of auxiliary additive(s) f);
   0.0005 to 0.02 parts of ingredient g) expressed by weight of (elemental) platinum metal;
   0.5 to 10 parts of titanium oxide h);
   20 to 100 parts of bulking filler(s) i);
   0 to 10 parts of one or more species j) belonging to the wollastonite group; and
   1 to 100 parts of semi-reinforcing filler(s) k).

3. The composition as claimed in claim 1, wherein ingredient a) comprises at least one polyorganosiloxane polymer containing from 0 to 4% by weight of vinyl groups and possessing a viscosity of greater than 1 million mPa·s at 25° C.

4. The composition as claimed in claim 1, wherein ingredient i) comprises silica, alumina or a mixture thereof.

5. The composition as claimed in claim 1, wherein ingredient i) consists of at least one aluminum trihydroxide treated with an organoalkoxysilane.

6. The compositions as claimed in claim 1, wherein ingredient j is present and comprises at least one species selected from: calcium metasilicate ($CaSiO_3$) or wollastonite; mixed calcium sodium metasilicate ($NaCa_2HSi_3O_9$) or pectolite; and mixed calcium manganese metasilicate $CaMn(SiO_2)_2$ or bustamite.

7. The composition as claimed in claim 1, wherein optional ingredient f is present and comprises at least one antistructuring product f1); and/or at least one polysiloxane resin f2); and/or at least one stabilizing agent f3); and/or at least one colored pigment f4); and/or at least one boron-based compound f5).

8. A method for the production of the sheath or primary insulation of one or more single conductors used in the construction of fire-resistant electrical wires or cables, said method comprising: depositing a composition of claim 1 around each single conductor and then crosslinking to a silicone elastomer by heating to a material temperature ranging from 100° C. to 200° C.

9. A fire-resistant electrical wire or cable comprising a composition as claimed in claim 1.

10. The electrical wire or cable as claimed in claim 9, wherein said wire and/or cable comprises a
   (1) a low smoke density which makes it possible to attain at least 80% light transmittance in accordance with the standard IEC 61 034, part 1; and/or
   (2) said wire and/or cable meets the standard NFC 32-070 CR1 at 500 volts.

11. The composition as claimed in claim 1, wherein ingredient b) comprises pyrogenic silica, precipitated silica, or a mixture of thereof.

12. The composition as claimed in claim 1, wherein the semi-reinforcing filler k) is calcined kaolin powder.

13. the composition as claimed in claim 1, wherein the semi-reinforcing filler k) is calcined kaolin powder that has undergone a chemical surface treatment.

14. The composition as claimed in claim 1, wherein the semi-reinforcing filler k) is talc.

15. The composition as claimed in claim 1, wherein the semi-reinforcing filler k) is calcium carbonate.

16. The composition as claimed in claim 1, wherein the semi-reinforcing filler k) is calcium carbonate that has been surface-treated.

17. The composition as claimed in claim 16, wherein the semi-reinforcing filler k) is calcium carbonate that has been surface-treated with vinylsilane, aminosilane, or (reactive or unreactive) silicone oils.

18. The composition as claimed in claim 1, wherein said composition comprises based on 100 parts by weight of polyorganosiloxane polymer(s) a):
   20 to 80 parts of semi-reinforcing filler(s) k).

19. The composition as claimed in claim 1, wherein said composition comprises based on 100 parts by weight of polyorganosiloxane polymer(s) a):
   40 to 70 parts of semi-reinforcing filler(s) k).

* * * * *